United States Patent [19]

Park et al.

[11] 4,226,946
[45] Oct. 7, 1980

[54] POLYETHYLENE BLEND FOAMS HAVING IMPROVED COMPRESSIVE STRENGTH

[75] Inventors: Chung P. Park, Pickerington; Richard A. Bouton, Reynoldsburg, both of Ohio

[73] Assignee: The Dow Chemical Company, Midland, Mich.

[21] Appl. No.: 14,184

[22] Filed: Feb. 22, 1979

[51] Int. Cl.² ............................................ C08J 9/14
[52] U.S. Cl. ........................................ 521/98; 521/134; 525/240
[58] Field of Search .................. 260/897 A; 521/134, 521/98; 525/240

[56] References Cited

U.S. PATENT DOCUMENTS

| 3,098,831 | 7/1963 | Carr | 521/134 |
| 3,183,283 | 5/1965 | Reding | 260/897 A |
| 3,231,636 | 1/1966 | Snyder et al. | 260/897 |
| 3,409,574 | 11/1968 | Gros | 260/897 A |
| 3,496,124 | 2/1970 | Needham et al. | 521/134 |
| 3,856,719 | 12/1974 | Miyamoto et al. | 260/897 A |
| 4,055,695 | 10/1977 | Last et al. | 521/134 |
| 4,089,818 | 5/1978 | Slocumb | 260/897 A |

FOREIGN PATENT DOCUMENTS 49-56497  2/1974  Japan .

*Primary Examiner*—Morton Foelak
*Attorney, Agent, or Firm*—Tai-Sam Choo

[57] ABSTRACT

Low density foams from polyethylene blends having substantially closed cell structure and improved compressive strength are prepared using gel-forming extrusion technology. The polyethylene blend comprises from about 35 to about 60 weight percent of low density branched polyethylene in admixture with from about 40 to about 65 weight percent of intermediate density linear polyethylene. An exemplary blowing agent is 1,2-dichlorotetrafluoroethane, there being up to about 0.12 gram-mole of such blowing agent per 100 grams of resin blend in the flowable gel.

14 Claims, No Drawings

POLYETHYLENE BLEND FOAMS HAVING IMPROVED COMPRESSIVE STRENGTH

BACKGROUND OF THE INVENTION

This invention relates to polyethylene foams made from blends of low density polyethylene and intermediate density linear polyethylene. It particularly pertains to improvement in processes whereby are obtained foams having substantially closed-cell structure and improved compressive strength.

The term "compressive strength" as used herein means the property of foam articles as determined by the test procedure described in ASTM D-3575-77, expressed in pounds per square inch (psi).

It is well known to make low density closed-cell ethylenic polymer resin foams by the process of extrusion foaming wherein a normally solid thermoplastic ethylenic polymer resin such as low density branched polyethylene is heat-plastified and mixed under pressure with a volatile material such as 1,2-dichlorotetrafluoroethane to form a flowable gel which is then passed through a shaping orifice or die opening into a zone of lower pressure. Upon the release of pressure, the volatile constituent of the gel vaporizes, forming a gas phase cellular structure in the gel which cools to a corresponding cellular foamed solid resin. Desirably, the resulting gas cells are substantially uniform in size, uniformly distributed through the foam body, and closed, i.e., separated from each other by membrane walls of resin. Although a number of general principles are thought to be understood, much of the extrusion foaming technology is empirical, based on experience, and directed to very specific materials and details to produce saleable products of narrowly defined specification.

However, attempts to make low density, i.e., less than 20 pounds per cubic foot, foam products from intermediate or high density linear polyethylenes have been met with numerous process difficulties.

It is also known to make polymer foams by the process of extrusion foaming utilizing blends of polyethylenes. In U.S. Pat. No. 3,496,124 polymer foams having high impact resistance are prepared from blends comprising from about 65 to about 80 parts by weight low density polyethylene, having densities within the range from about 0.89 to about 0.93 g/cc, and from about 35 to about 20 parts by weight high density polyethylene, having densities within the range from about 0.94 to about 0.97 g/cc. This reference does not contemplate the present invention: low density polyethylene comprises from about 40 to about 55 weight percent in the blend of the present invention, as compared to 65 to about 80 weight percent in the reference. Published Japanese patent application No. 47-56,497 filed June 8, 1972, disclose a polyethylene foam prepared from a blend of polyethylenes of two different densities. More specifically, polyethylene of density <0.93 and of density <0.94 are melt blended, pulverized, immersed in liquid blowing agents, and foamed at a temperature <20° higher than the arthmetical mean of the m.p. of the two polyethylenes. This reference does not suggest the use of intermediate density linear polyethylene in the polymer blend. U.S. Pat. No. 3,793,239 discloses a process for making foamed plastic films by extrusion foaming. More specifically, blends of polymers containing as a major component, a thermoplastic polymer of higher melting point than the crystalline polyolefin, the thermoplastic polymer of higher melting point being present from 1 to 15 percent by weight of the blend, and a two-component blowing agent system were used. Blends of high density polyethylene and polypropylene are preferred. This reference does not suggest the use of a low density polyethylene in the polymer blend.

U.S. Pat. No. 3,351,569 teaches a method for making fine-celled foam products by contacting crystalline polymer of ethylene or olefin in the pilot stage with a liquid blowing agent, provided that the polymers contain at least 10 percent by weight of a finely divided solid inorganic substance. The reference also discloses that mixtures of two or more of crystalline polymers of ethylene or propylene can also be used. The reference also discloses that a mixture of an aliphatic hydrocarbon and a fully halogenated alkane derivative containing both chlorine and fluorine can be used as blowing agent. However, this reference is limited to a method of making fine-cell foamed products, and, as such, does not contemplate the instant invention.

It is desirable that foam resin products have improved compressive strength at a given foam density, as compared to those products previously known.

It is, therefore, one object of this invention to provide improved foams of polymer resin blends. Another object is to provide a method and a means for making such foams. A particular object is to provide such improved method and a means for making polyethylene blend foams having substantially closed-cell structure and improved compressive strength per unit of density. Other objects and advantages of the invention are brought out in the description that follows.

SUMMARY OF THE INVENTION

The objects of this invention are obtained in polyethylene blend foams having density from about 3.0 to about 15.0 pounds per cubic foot, substantially closed-cell structure and average compressive strength at 10 percent deformation of from about 7 to about 170 psi, preferably about 7 to about 60 psi, and an improved method and a means for making the same from polyethylene blends and at least one blowing agent using gel-forming extrusion technology. The polyethylene blend comprises from about 35 to about 60 weight percent of low density branched polyethylene in admixture with from about 40 to about 65 weight percent of intermediate density linear polyethylene. The resulting polyethylene blend foams have densities from about 3.0 to about 15.0 pounds per cubic foot (pcf) and are preferably foams having densities from about 3.0 to about 7.0 pcf.

The term "average compressive strength" as used herein means an average of compressive strength values, expressed in pounds per square inch (psi), in extrusion, vertical and transverse directions.

A particular benefit of this invention is the realization of low density foam from intermediate density linear polyethylene resin by blending therewith low density branched polyethylene.

DETAILED DESCRIPTION AND EMBODIMENT

The low density branched polyethylene which is used in accordance with this invention may have a density from about 0.910 to about 0.930 g/cc and melt index from about 0.5 to about 50 dg/min. produced by the well known high pressure polymerization processes.

The intermediate density linear polyethylene which is used in accordance with this invention may have a density from about 0.931 to about 0.940 and a melt index from 0.5 to 50 dg/min. Intermediate density linear polyethylene having these properties can be produced by the well known Ziegler-type low pressure polymerization processes.

The starting polyethylene blend can also contain small portions of high density linear polyethylenes having a density greater than 0.940, provided that the resulting blend is extrudable.

The blowing agents useful for making polyethylene blend foams of this invention are well known: solids which decompose into gaseous products at the extrusion temperatures and volatile liquids may be employed. A particularly preferred class of blowing agents are halogenated hydrocarbon compounds having from 1 to 4 carbon atoms. Examples of such blowing agents are dichlorodifluoromethane, trichloro-fluoromethane, chloro-difluoromethane, 1,2-dichlorotetrafluoroethane, 1-chloro-1,1-difluoroethane, 1,1-dichlorotrifluoroethane, 1,1-difluoroethane, 1-chloro-1,2,2,2-tetrafluoroethane, 1-chloro-1,1,2,2-tetrafluoroethane, 2,2-difluoropropane and 1,1,1-trifluoropropane. 1,2-dichlorotetrafluoroethane is most preferred. When the halogenated hydrocarbon compounds are used as blowing agent, there can be up to about 0.12 gram mole of such blowing agent per 100 grams of polyethylene resin blend in the flowable gel. Although use of a single blowing agent is preferred, mixtures of two or more of such blowing agents may also be used.

The polyethylene blends of the present invention can be prepared by admixing from about 35 to about 60 weight percent, preferably from about 40 to about 55 percent by weight, most preferably about 50 percent by weight, of a low density branched polyethylene and from about 40 to about 65 percent by weight, preferably from about 45 to about 60 percent by weight, most preferably about 50 percent by weight, of an intermediate density linear polyethylene. These polyethylenes can be blended together in a variety of different ways readily known in the art, and the manner of blending is not critical as long as the two polyethylenes are thoroughly mixed together.

Particularly useful blends of polyethylenes have a difference in melt index value of less than about 3.0 between the polyethylenes.

The blowing agent is compounded into the starting polyethylene blend in proportions to make the desired degree of expansion in the resulting foamed cellular product, usually up to about 20 volume expansion to make products having foamed densities down to about 0.048 gram per cc (about 3.0 pounds per cubic foot). Depending on the starting proportion of blowing agent, the resulting foamed products of this invention have densities from about 3.0 to about 15.0 pounds per cubic foot (pcf), preferably from about 3.0 to about 7.0 pcf.

The blowing agent is compounded into the starting polyethylene blend in conventional fashion to make a flowable gel, preferably in continuous manner, e.g., in a mixing extruder, using heat to plastify the resin blends, pressure to maintain the blowing agent in non-gaseous state, and mechanical working to obtain a thorough mixing of the polyethylene blend and blowing agent. The resulting gel is then cooled, if necessary, and passed through a suitable die orifice into a zone of lower pressure, e.g., normal ambient air atmosphere, where it expands to a lower density, cellular mass. As the foamed extrusion forms, it is taken away from the extruder, allowed to cool to harden the polyethylene blend, and collected for further processing, storage and other disposals.

The resulting polyethylene blend foam is comprised of substantially closed-cell structure and flexible to bending and shaping. Furthermore, the foam product has improved compressive strength measured at 10 percent deformation as compared to foam articles having equivalent foam density but made from low density polyethylene.

The gas space of the cells of the resulting polyethylene blend foam originally comprises as an essential constituent the particular blowing agent(s) used to make the foams. As time passes, the blowing agent diffuses out of the foam cells and are gradually replaced by air diffusing into such cells. Ultimately, the gas space of the foam cells is essentially occupied by air.

Finely divided solid materials such as calcium silicate, zinc stearate, magnesium silicate and the like can advantageously be incorporated with the polymer blend or gel prior to expanding the same. Such finely divided materials aid in controlling the size of the cells, and are usually employed in amounts up to one (1) percent by weight of the polymer.

Numerous fillers, pigments, lubricants, antioxidants and the like well known in the art can also be incorporated into the polyethylene blend as desired.

The specific working examples that follow are intended to illustrate the invention but are not to be taken as limiting its scope. In the examples, parts and percentages are by weight unless otherwise specified or required by the context.

EXAMPLE 1

Polyethylene blend foams are made by continuous extrusion from a conventional screw-type extruder. The extruder comprises the usual sequential zones usually denominated feed zone, compression and melt zone, metering zone, and mixing zone. The barrel is provided with conventional electric heaters for zoned temperature control and with usual instrumentation. An inlet opening for fluid blowing agent under pressure and feed rate control is provided in the extruder barrel between the metering zone and the mixing zone. The discharge end of the mixing zone of the extruder is connected, through a cooler providing a cooling and temperature control zone, to a die orifice having generally rectangular configuration.

In practice, polyethylene resins in the form of common granules are fed through the feed hopper to the extruder. The temperature in the metering zone is maintained in the range 180°±20° C. Blowing agent is pumped into the inlet between the metering and mixing zones at a predetermined rate under pressure to maintain liquid phase. The mixed mass of molten polyethylene blend and blowing agent from the mixing zone is cooled in the temperature control zone to a substantially uniform temperature which is just above the temperature at which solid polymer would crystallize out of the gel, which in the case of the polyethylene blends used in this example is in the range from about 115° C. to about 119° C., before passing through the die orifice. The mass emerging from the die orifice to atmospheric pressure expands and forms a cellular foam which is continuously conducted away from the die as the foam forms, cools and hardens to a strip of foamed, cellular, flexible solid polyethylene blend.

In the tests described below in this Example, the polyethylenes listed in Table I are used. Specific types and ratios of blends of these polyethylenes are listed in Table II. These blends are mixed in the feed hopper of the extruder with magnesium silicate and calcium stearate as foam nucleation and cell size control agents fed to the hopper at a substantially constant rate as shown in Table II. The blowing agent comprises dichlorodifluoromethane (FC-12) or 1,2-dichlorotetrafluoroethane (FC-114) fed to the extruder at a substantially constant rate as shown in Table II.

Various physical properties of the resulting extruded foam products are measured and recorded in Table II.

TABLE I

| Polymer Designation | Polymer Composition | Density (g/cc) | Melt Index (dg/min) | Melting Point (°C.) |
|---|---|---|---|---|
| I | Low density Polyethylene | .916 | 5.0 | 110 |
| II | Low density Polyethylene | .920 | 2.1 | 110 |
| III | Low density Polyethylene | .925 | 4.0 | 110 |
| IV | Linear Polyethylene | .935 | 5.0 | 124 |

Measurement of percent open cell and a subjective evaluation of skin quality provide a good indication regarding the processibility of a given polyethylene blend formulation. It is desirable to have a low percentage of open cells as well as a smooth, uniform skin on the foam. Open cell concentrations of about 15 to 30 percent indicate the onset of processibility problems. Open cell concentrations of greater than 30 percent are considered unacceptable. Given this criteria, Test No. 1.6 indicates that border line, yet still acceptable processibility is realized when the foam density is lowered to 3.0 pcf. Attempts to lower the foam density below 3.0 pcf, as shown in Test No. 1.7, resulted in total collapse of the foam at the die. From Test No. 1.8 it can be seen that FC-12 may be substituted for FC-114 as the blowing agent with little change in processibility.

EXAMPLE 2

Foams are produced from blends of various low density polyethylenes and various linear polyethylenes listed in Table I by continuous extrusion using a different conventional screw-type extruder similar to the one described in Example 1. The die orifice had generally rectangular configuration. Processibility characteristics of the foams listed in this Example are shown in Table III.

TABLE II

| Test No. | Polyethylene Type (1) | Polyethylene Ratio (2) | Type | BA Rate (3) | Rate (4) | Foam Density (pcf) (5) | Percent Open Cell (6) | Skin Quality | Average Compressive Strength (psi) (7) |
|---|---|---|---|---|---|---|---|---|---|
| 1.9 | I* | 100 | FC-114 | 7.5 | 0.30/0.10 | 5.9 | 2.0 | Excellent | 18.7 |
| 1.1 | I* | 100 | FC-114 | 11.5 | " | 3.9 | 11.0 | Excellent | 9.7 |
| 1.2 | I* | 100 | FC-12 | 10.0 | " | 4.0 | 19.5 | Good | 8.7 |
| 1.3 | I* | 100 | FC-12 | 12.4 | " | 3.3 | 28.0 | Poor | ND |
| 1.4 | I/IV | 50/50 | FC-114 | 8.2 | 0.14/0.05 | 5.2 | 1.0 | Excellent | 24.5 |
| 1.5 | I/IV | 50/50 | FC-114 | 10.7 | 0.05/0.02 | 4.0 | 5.0 | Excellent | 15.3 |
| 1.6 | I/IV | 50/50 | FC-114 | 15.3 | " | 3.0 | 27.0 | Good | 9.6 |
| 1.7* | I/IV | 50/50 | FC-114 | 17.5 | " | | Foam Collapsed | | |
| 1.8 | I/IV | 50/50 | FC-114 | 10.0 | " | 3.0 | 15.6 | Fair | 7.1 |

Notes:
(1) See TABLE I
(2) Weight percent of each polyethylene in the blend
(3) Rate of feed of blowing agent in parts per hundred
(4) Rate of feed of magnesium silicate and calcium stearate in parts per hundred
(5) Density of form body in pound per cubic foot, measured within about 5 minutes after extrusion
(6) Amount of open cell in foam structure measure per ASTM D-2856-A
(7) Average compressive strength at 10% deformation measured per ASTM D-3575-77
ND = Not determined
* = Not an example of this invention.

TABLE III

| Test No. | Polyethylene Type (1) | Polyethylene Ratio (2) | Type | BA Rate (3) | Rate (4) | Foam Density (pcf) (5) | Percent Open Cell (6) | Skin Quality |
|---|---|---|---|---|---|---|---|---|
| 2.0* | II/IV | 85/15 | FC-114 | 12.7 | 0.55/0.40 | 3.6 | 71 | Poor |
| 2.1* | II/IV | 70/30 | " | 12.9 | " | 3.6 | 62 | Poor |
| 2.2 | II/IV | 55/45 | " | 12.4 | " | 3.7 | 26 | Fair |
| 2.3 | II/IV | 40/60 | " | 12.4 | " | 3.7 | 24 | Fair |
| 2.4* | II/IV | 25/75 | " | 12.0 | " | Foam Collapsed | | |
| 2.5 | I/IV | 40/60 | " | 12.7 | " | 3.7 | 11 | Good |
| 2.6 | III/IV | 40/60 | " | 12.8 | " | 3.7 | 17 | Good |
| 2.7* | I | 100 | " | 13.5 | " | 3.7 | 9 | Good |
| 2.8* | IV | 100 | " | 8.8 | " | Foam Collapsed | | |

Notes:
Same as TABLE II, except (4) Rate of feed of magnesium silicate and zinc sterate in part per hundred.

From the results and data shown in Table II, it will be seen, that polyethylene blend foams made in accordance with this invention have substantially improved compressive strength at 10% deformation as compared to the polyethylene foams of equivalent foam density made from low density polyethylene alone.

From the results and data shown in Table IV, it will be seen, from Test Nos. 2.0 through 2.4, that the optimum polyethylene blends from the processibility standpoint comprises from about 40 to about 55 weight percent of low density polyethylene in admixture with from about 45 to about 60 weight percent of intermediate density linear polyethylene. As shown in Test Nos. 2.3, 2.5, and 2.6 the best processability is obtained by blending the linear polyethylene with a low density polyethylene of equivalent melt index, i.e., 5.0; the worst processability is obtained from the blend of polyethylenes with the largest difference in melt indexes.

In place of all or part of the FC-12 or FC-114 as the blowing agent, there can be used one or more of other blowing agents as disclosed hereinbefore with substantially similar results.

In place of the particular polyethylenes used to make up the polyethylene blends in the preceding examples, there can be used other blends of low density branched polyethylene and intermediate density linear polyethylene as hereinbefore described with substantially similar results in obtaining polyethylene blend foams having substantially closed-cell structure and improved compressive strength.

What is claimed is:

1. In a method of making polymer resin foams by the process of extrusion foaming wherein a normally solid thermoplastic resin is heat-plastified and mixed with at least one blowing agent to form a flowable gel which is then passed through a die opening into a zone of lower pressure to cause expansion of the extruded material which is then cooled to form a cellular resinous body, the improvement wherein the thermoplastic resin comprises a polyethylene blend comprising about 35 to about 60 weight percent of low density branched polyethylene having a density from about 0.910 to about 0.930 in admixture with from about 40 to about 65 weight percent of intermediate density linear polyethylene having a density from about 0.931 to 0.940 thereby producing polyethylene blend foams having density of from about 3.0 to about 15.0 pounds per cubic foot, substantially closed-cell structure and compressive strength at 10% deformation of from about 7 to about 170 psi.

2. The method according to claim 1 wherein the blend foams have density of from about 3.0 to about 7.0 pounds per cubic foot.

3. The method according to claim 2 wherein the blend foams have compressive strength at 10% deformation of from about 7 to about 60 psi.

4. The method according to claim 1 wherein the polyethylenes in the blend have a difference in melt index values of less than 3.0 therebetween.

5. A method according to claim 1 wherein the blowing agent is 1,2-dichlorotetrafluoroethane or 1-chloro-1,1-difluoroethane.

6. A method according to claim 1 wherein the blowing agent is 1-chloro-1,2,2,2-tetrafluoroethane or 1-chloro-1,1,2,2-tetrafluoroethane.

7. As an article of manufacture, a polyethylene blend foam having substantially closed-cell structure, dimensional stability, and compressive strength at 10% deformation of from about 7 to about 170 psi, wherein said blend comprises from about 35 to about 60 weight percent of low density branched polyethylene having a density from about 0.910 to about 0.930 in admixture with from about 40 to about 65 weight percent of intermediate density linear polyethylene, having a density from about 0.931 to about 0.940 said foam having density from about 3.0 to about 15.0 pounds per cubic foot and further characterized in that the gas space of said foam cells originally comprises as an essential constituent at least one volatile material used as blowing agent.

8. An article of manufacture according to claim 7 wherein said blend foam has density from about 3.0 to 7.0 pounds per cubic foot.

9. An article of manufacture according to claim 7 wherein the polyethylenes in the blend have a difference in melt index values of less than 3.0 therebetween.

10. An article of manufacture according to claim 7 wherein the volatile material is 1,2-dichlorotetrafluoroethane.

11. An article of manufacture according to claim 6 wherein the volatile material is 1-chloro-1,2,2,2-tertafluoroethane or 1-chloro-1,1,2,2-tetrafluoroethane.

12. An article of manufacture according to claim 7 wherein the volatile material is 1-chloro-1,1-difluoroethane.

13. An article of manufacture according to claim 7 wherein the volatile material is 1,1,1-trifluoropropane.

14. An article of manufacture according to claim 7 wherein the gas space of said foam cells ultimately comprises as an essential constituent air.

* * * * *